Oct. 22, 1963 L. YOUNG ETAL 3,108,274
MICROWAVE TARGET AZIMUTH SIMULATOR
Filed Dec. 9, 1958
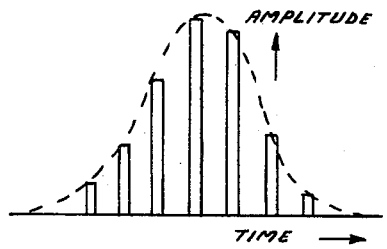
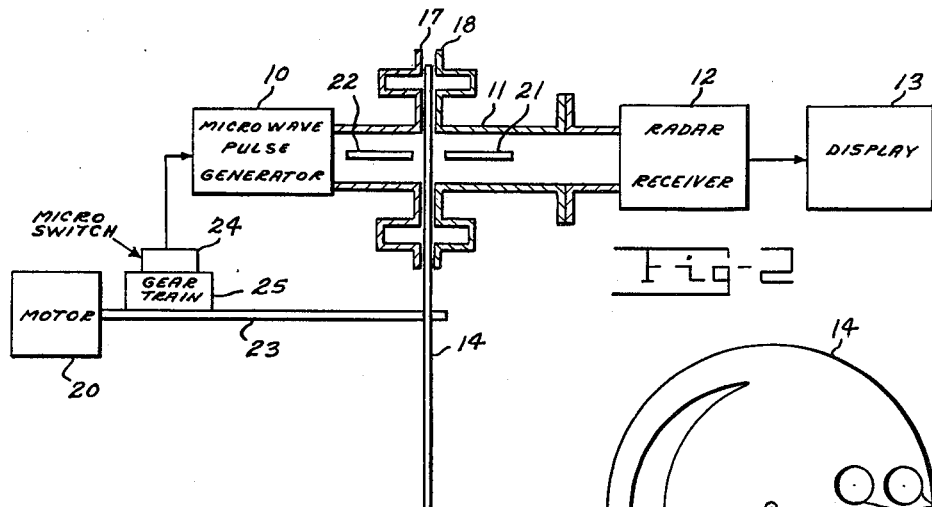
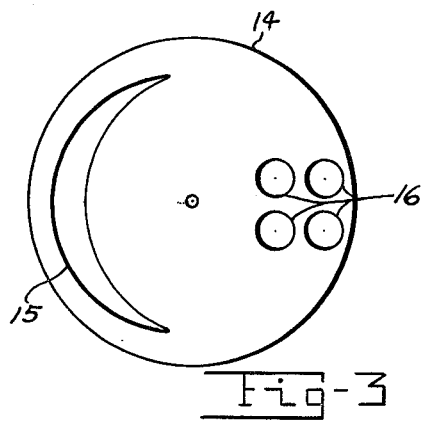
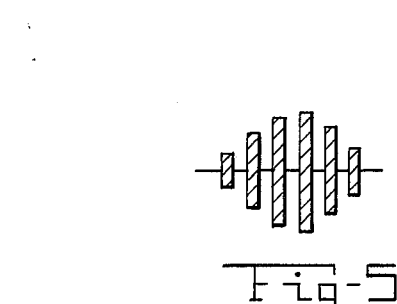
INVENTORS
LEO YOUNG
ROBERT J. O'DONNELL

3,108,274
MICROWAVE TARGET AZIMUTH SIMULATOR
Leo Young and Robert J. O'Donnell, Baltimore, Md., assignors, by mesne assignments, to the United States of America as represented by the Secretary of the Air Force
Filed Dec. 9, 1958, Ser. No. 779,262
2 Claims. (Cl. 343—17.7)

This invention relates to a microwave target azimuth simulator.

One object of the invention is to provide an apparatus for simulating azimuth targets in such a manner that a simulated target can be displayed at a chosen azimuth angle on the radar display screen.

This and other objects will be more fully understood from the following detailed description taken with the drawing wherein:

FIG. 1 shows the pulse envelope for a train of pulses received from a target.

FIG. 2 shows a target azimuth simulator partially in block form according to one embodiment of the invention.

FIG. 3 shows the modulating disc used in the target azimuth simulator of FIG. 2.

FIG. 4 shows the RF envelope for the output of the pulse klystron of FIG. 2.

FIG. 5 shows the RF envelope for the output of the target azimuth simulator.

It is sometimes desirable to produce simulated azimuth targets for testing radar receivers or for training purposes. To simulate the echoes from a target as the beam swings over the target it is necessary to provide a microwave system for producing a small number of microwave pulses rising and falling in amplitude such as those shown in FIG. 1.

Such an apparatus is shown in FIG. 2 wherein a pulse generator 10, which may be a klystron, produces an output signal as shown in FIG. 4. This signal is transmitted through the wave guide 11 to the receiver 12. The output of the receiver 12 is fed to a radar display device 13. A metal disc 14 shown in detail in FIG. 3, having a crescent-shaped slot 15, passes between two choke flanges 17 and 18 on wave guide 11. The circular holes 16 in disc 14 are located opposite the crescent-shaped slot 15 and are for the purpose of balance. The disc 14 is driven by a motor 20. The crescent-shaped slot in the disc 14 acts as a symmetrical inductive iris across the wave guide 11 to control the power transmitted to the radar receiver 12. FIG. 5 shows the RF envelope for the pulse generator signal as modulated by the slot 15 in the disc 14.

In order to simulate operating conditions with a matched antenna seen by the receiver the source impedance should be matched into the line leading to the receiver. The spinning disc, when the aperture is partly closed, presents a reactive mismatch. In order to reduce this mismatch, an attenuator 21 is provided between the disc 14 and the receiver 12. An attenuator 22 is provided between the pulse generator 10 and the disc 14 to protect the pulse generator from the mismatch of the disc when the aperture is closed or partly closed. It is advantageous to cover the metallic surface of the disc with resistive material to reduce leakage and to damp out resonant effects which depend upon the amount of the wave guide opening.

The disc is connected to the motor 20 by means of a shaft 23. A microswitch 24 is coupled to the shaft 23 by means of a gear train 25. The microswitch 24 provides a gate pulse for the microwave generator 10, at time intervals corresponding to one revolution of the radar antenna. In one test device, this time was set at once in every one hundred revolutions of the disc with the length of the crescent-shaped slot equal to 160° on the disc and the speed of the motor being equal to 1750 r.p.m. Though a separate motor is shown for driving the disc, it is obvious that this motor could be replaced by a set of gears connected to the motor driving the antenna so that the simulated echoes would be synchronized directly with the antenna. Also the gate pulse for the pulse generator could be derived directly from the antenna.

The distribution shown in FIG. 1 has been obtained with devices constructed according to this invention.

While the apparatus has been described as a target azimuth simulator, it is obvious that it may have other uses such as a function generator in analog computers.

There is thus provided an apparatus for simulating azimuth targets in such a manner that a simulated target can be displayed at a chosen azimuth angle.

While one specific embodiment has been described in some detail, it is obvious that numerous changes may be made without departing from the general principles and scope of the invention.

We claim:

1. A device for producing simulated azimuth targets for application to a radar receiver, comprising; a pulse generator, a wave guide for coupling the output of said pulse generator to said radar receiver, a disc having a crescent-shaped slot therein, means for rotating said disc across said wave guide to thereby amplitude modulate the signal from said pulse generator, impedance matching means located within said wave guide adjacent said disc, a layer of resistive material located on each surface of said disc, means coupled to said disc rotating means for triggering said pulse generator into operation once in every certain predetermined number of revolutions of said disc.

2. A device for producing simulated azimuth targets for application to a radar receiver, comprising; a klystron pulse generator, a wave guide for coupling the output of said pulse generator to said radar receiver, a pair of choke flanges on said wave guide, a disc having a crescent-shaped slot therein, means for rotating said disc between said flanges and across said wave guide to thereby amplitude modulate the signal from said pulse generator, impedance matching means located within said wave guide adjacent said disc, a layer of resistive material on each surface of said rotating disc, and means coupled to said disc rotating means for triggering said pulse generator into operation once every certain predetermined number of revolutions of said disc.

References Cited in the file of this patent
UNITED STATES PATENTS

| | | |
|---|---|---|
| 2,423,130 | Tyrrell | July 1, 1947 |
| 2,443,643 | Schelleng | June 22, 1948 |
| 2,472,782 | Albersheim | June 14, 1949 |
| 2,510,299 | Schramm | June 6, 1950 |
| 2,572,088 | Young et al. | Oct. 23, 1951 |

OTHER REFERENCES

Penrose et al., "Principles and Practice of Radar," published 1955, by George Newnes Ltd., London, England, pp. 508, 509, and 510.